(12) United States Patent
Mantell et al.

(10) Patent No.: US 10,894,358 B2
(45) Date of Patent: Jan. 19, 2021

(54) OPTIMIZED NOZZLE ARRANGEMENT FOR AN EXTRUDER HEAD USED IN AN ADDITIVE MANUFACTURING SYSTEM

(71) Applicant: Xerox Corporation, Norwalk, CT (US)

(72) Inventors: David A. Mantell, Rochester, NY (US); Stuart A. Schweid, Pittsford, NY (US); Christopher G. Lynn, Wolcott, NY (US); Peter J. Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 300 days.

(21) Appl. No.: 16/129,943

(22) Filed: Sep. 13, 2018

(65) Prior Publication Data

US 2020/0086562 A1 Mar. 19, 2020

(51) Int. Cl.
| | |
|---|---|
| *B29C 64/209* | (2017.01) |
| *B33Y 30/00* | (2015.01) |
| *B29C 64/336* | (2017.01) |
| *B29C 64/295* | (2017.01) |
| *B29C 48/25* | (2019.01) |
| *B33Y 50/02* | (2015.01) |
| *B33Y 40/00* | (2020.01) |

(52) U.S. Cl.
CPC .......... *B29C 64/209* (2017.08); *B29C 48/266* (2019.02); *B29C 64/295* (2017.08); *B29C 64/336* (2017.08); *B33Y 30/00* (2014.12); *B33Y 40/00* (2014.12); *B33Y 50/02* (2014.12)

(58) Field of Classification Search
CPC ... B29C 64/118; B29C 64/209; B29C 64/295; B29C 64/336; B29C 64/393; B29C 48/266; B33Y 30/00; B33Y 40/00; B33Y 50/02
See application file for complete search history.

(56) References Cited

U.S. PATENT DOCUMENTS

| | | |
|---|---|---|
| 4,014,029 A | 3/1977 | Lane et al. |
| 6,024,440 A | 2/2000 | Murthy et al. |
| 6,345,897 B1 | 2/2002 | Fisher |
| 7,249,815 B2 | 7/2007 | Keller et al. |
| 7,350,902 B2 | 4/2008 | Dietl et al. |
| 9,168,748 B2 | 10/2015 | Borrego Lebrato et al. |
| 2009/0258099 A1 | 10/2009 | Brown |
| 2014/0002546 A1 | 1/2014 | Phillips et al. |
| 2016/0325498 A1 | 11/2016 | Gelbert |
| 2017/0157828 A1 | 6/2017 | Mandel et al. |

(Continued)

*Primary Examiner* — Xiao S Zhao
*Assistant Examiner* — Joseph S Leyson
(74) *Attorney, Agent, or Firm* — Maginot Moore & Beck LLP

(57) ABSTRACT

An extruder head has an arrangement of multiple nozzles in the faceplate that avoids aligning the multiple nozzles at angular orientations from the 0°-180° axis and 90°-270° axis intersection at the center of the faceplate. The extruder head includes a housing having a faceplate with a plurality of nozzles that are equally spaced from one another when the nozzles are projected onto a first axis in a plane of the faceplate and the nozzles are equally spaced from one another when projected onto a second axis in the plane of the faceplate that is orthogonal to the first axis. Movement of the extruder head along any angular path from the intersection of the first axis and the second axis in the plane of the faceplate enables at least one nozzle in the plurality of nozzles to not be aligned with any other nozzle.

16 Claims, 5 Drawing Sheets

(56) References Cited

U.S. PATENT DOCUMENTS

| | | | |
|---|---|---|---|
| 2017/0157831 A1* | 6/2017 | Mandel | B33Y 30/00 |
| 2017/0157844 A1* | 6/2017 | Mandel | B29C 64/118 |
| 2018/0133980 A1* | 5/2018 | Mantell | B29C 64/20 |
| 2019/0030805 A1* | 1/2019 | Mantell | B29C 64/393 |
| 2019/0030819 A1* | 1/2019 | Mantell | B29C 48/302 |
| 2019/0152154 A1* | 5/2019 | Mantell | B29C 48/92 |
| 2019/0322043 A1* | 10/2019 | Mantell | B33Y 10/00 |

* cited by examiner

OPTIMIZED NOZZLE ARRANGEMENT FOR AN EXTRUDER HEAD USED IN AN ADDITIVE MANUFACTURING SYSTEM

TECHNICAL FIELD

This disclosure is directed to multi-nozzle extruders used in three-dimensional object printers that are implemented with vector graphics and, more particularly, to the arrangement of nozzles in such extruders.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extruders that soften or melt extrusion material, such as ABS plastic, into thermoplastic material and then emit the thermoplastic material in a predetermined pattern. The printer typically operates the extruder to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Most printers that print two dimensional images use a bitmapped image that matches the resolution of the printer. The printhead is then scanned across the media in paths called rasters. Thus, this method of printing is sometimes called raster printing. A printer forms the image by successively scanning the printhead across the ink or other marking material receiving surface raster by raster. Sometimes this scanning is performed with a back and forth motion, which is referred to as bi-directional printing. In other cases, the receiving surface or the printhead moves in a single direction only and this type of printing is called unidirectional printing. Vector graphics printers operate differently. Two-dimensional images formed by vector graphics printers use descriptions of shapes based on a series of points, lines, and curves. These descriptions are used as commands to move a tool, such as an extrusion head, along paths defined by the lines and curves. This movement occurs in more than two orthogonal directions. The printers that use a multi-nozzle extruder described in this document are vector graphics printers.

Many existing three-dimensional printers use a single extruder that extrudes material through a single nozzle. The printhead moves in a predetermined path to emit the build material onto selected locations of a support member or previously deposited layers of the three-dimensional printed object based on model data for the three-dimensional printed object. However, using a printhead with only a single nozzle to emit the build material often requires considerable time to form a three-dimensional printed object. Additionally, a printhead with a larger nozzle diameter can form three-dimensional printed object more quickly but loses the ability to emit build material in finer shapes for higher detailed objects while nozzles with narrower diameters can form finer detailed structures but require more time to build the three-dimensional object.

To address the limitations of single nozzle extruders, multi-nozzle extruders have been developed. In these multi-nozzle extruders, the nozzles are formed in a common faceplate and the materials extruded through the nozzles can come from one or more manifolds. In extruders having a single manifold, all of the nozzles extrude the same material, but the fluid path from the manifold to each nozzle can include a valve that is operated to open and close the nozzles selectively. This ability enables the shape of the swath of thermoplastic material extruder from the nozzles to be varied by changing the number of nozzles extruding material and which ones are extruding material. In extruders having different manifolds, each nozzle can extrude a different material with the fluid path from one of the manifolds to its corresponding nozzle including a valve that can be operated to open and close the nozzle selectively. This ability enables the composition of the material in a swath to vary as well as the shape of the swath of thermoplastic material extruder from the nozzles to be varied. Again, these variations are achieved by changing the number of nozzles extruding material and which ones are extruding material. These multi-nozzle extruders enable different materials to be extruded from different nozzles and used to form an object without having to coordinate the movement of different extruder bodies. These different materials can enhance the ability of the additive manufacturing system to produce objects with different colors, physical properties, and configurations. Additionally, by changing the number of nozzles extruding material, the size of the swaths produced can be altered to provide narrow swaths in areas where precise feature formation is required, such as object edges, and to provide broader swaths to quickly form areas of an object, such as its interior regions.

In these multi-nozzle extruders having their nozzles in a common faceplate, the movement of the faceplate with reference to the build platform as well as the orientation of the faceplate with respect to the XY axes of the platform are critical to the formation of a swath. As used in this document, a "swath" refers to the extrusion of one or more lines of extrusion material from one or more opened nozzles in a multi-nozzle extruder that produces a pattern of the extrusion material. Even if multiple nozzles are opened, but not all of the lines of extrusion material contact one another, the spatially separated extrusions together constitute a swath. A contiguous swath is one in which all of the lines of extrusion material from multiple nozzles are in contiguous contact across the swath in a cross-process direction. At some orientations of the extruder's path, some of the nozzles align with one another in a way that prevents a contiguous swath of extruded material from being formed. As shown in FIG. 5, a previously known faceplate having nine nozzles is depicted. When the faceplate is oriented as shown in the figure and moved along the 0°-180° (X) axis or the 90°-270° (Y) axis, all nine nozzles contribute to forming a contiguous swath and the swath has its greatest width. As used in this document, the term "0°-180° axis" means movement in either the 0° direction or the 180° direction with reference to the center of the faceplate and the faceplate of the extruder is oriented so if all of the nozzles are open, then the widest contiguous swath that the extruder can produce is formed and the term "90°-270° axis" means movement in either the 90° or the 270° direction with reference to the center of the faceplate and the faceplate of the extruder is oriented so if all of the nozzles are open, then the widest contiguous swath that the extruder can produce is formed. When the faceplate remains oriented as shown on the 0°-180° axis and 90°-270° axis but is moved along a path rotated 18° from one of these axis, as shown in the far right illustration, the nine nozzles become three rows of three nozzles that are aligned with one another so that for each row of three nozzles the material for one of the nozzles is extruded directly on top of the extrusion material extruded by the other two and the swath is only three lines with gaps between the lines of extrusion material forming the swath so none of the lines touch another line in the swath in the cross-process direction. The speed of the extruder must be slowed significantly at this angle to enable the lines to merge into a contiguous swath. Thus, the widest contiguous swaths are produced at full speed when the faceplate of FIG. 5 is moved along the 0°, 90°, 180°, and 270° paths and the swaths are most narrow and the beads of extruded material are most separated from one another along the 18°, 108°, 198°, and 288° paths. The separation occurs because the orientation of the faceplate and the direction of the relative movement between the extruder and the platform arranges the nozzles in the faceplate into an array having orthogonal columns and rows. This arrangement reduces the distance between the lines formed by the nozzles in the columns so the lines align with one another and separates the lines by the spacing between the nozzles in a row. In the center of an object where feature differentiation is usually unimportant, the faceplate movement is preferred to be in one of the directions producing the widest contiguous swaths so object formation speed can be maximized. At the outside edges of an object where feature shapes are more varied and sometimes intricate; however, fewer nozzles, and perhaps only a single nozzle, may be opened to enable formation of the features. Unfortunately, this type of extruder operation does not capitalize on the large number of nozzles available for object formation and is inherently slow. Thus, some of the speed advantage in having multiple nozzles in a common faceplate is lost and, for many parts, more time can be spent on the outline of the object than was spent on the formation of the interior of the object. An extruder head having multiple nozzles in a common faceplate for a three-dimensional object printer that can avoid the issues arising from multiple nozzle alignments at various angular orientations of the extruder would be beneficial.

SUMMARY

A new extruder head has an arrangement of multiple nozzles in the faceplate that avoids aligning the multiple nozzles at angular orientations from a pair of orthogonal axes in the plane of the faceplate. The extruder head includes a housing having at least one manifold configured to hold a volume of thermoplastic material, and a faceplate mounted to the housing, the faceplate having a plurality of nozzles formed in the faceplate that are fluidly connected to the at least one manifold and the nozzles in the faceplate are equally spaced from one another when the nozzles are projected onto a first axis in a plane of the faceplate and the nozzles are equally spaced from one another when projected onto a second axis in the plane of the faceplate that is orthogonal to the first axis, and movement of the extruder head along any angular path from an intersection of the first axis and the second axis in the plane of the faceplate enables at least one nozzle in the plurality of nozzles to not be aligned with any other nozzle.

Another extruder head has an arrangement of multiple nozzles in the faceplate of an extruder head that avoids aligning with the nozzles at angular orientations from a pair of orthogonal axes in the plane of the faceplate. This extruder head includes a housing having at least one manifold configured to hold a volume of extrusion material and a faceplate mounted to the housing, the faceplate having a plurality of nozzles formed in the faceplate that are fluidly connected to the at least one manifold and the nozzles in the faceplate are equally spaced from one another when the nozzles are projected onto a first axis in a plane of the faceplate and the nozzles are equally spaced from one another when projected onto a second axis in the plane of the faceplate that is orthogonal to the first axis, the number of nozzles in the plurality of nozzles is odd, and movement of the extruder head along any angular path from an intersection of the first axis and the second axis in the plane of the faceplate enables at least one nozzle in the plurality of nozzles to not be aligned with any other nozzle.

BRIEF DESCRIPTION OF THE DRAWINGS

The foregoing aspects and other features of an extruder head having a multi-nozzle arrangement that avoids aligning multiple nozzles at angular orientations from the 0°-180° axis and 90°-270° axis are explained in the following description, taken in connection with the accompanying drawings.

DETAILED DESCRIPTION

Figure 1:
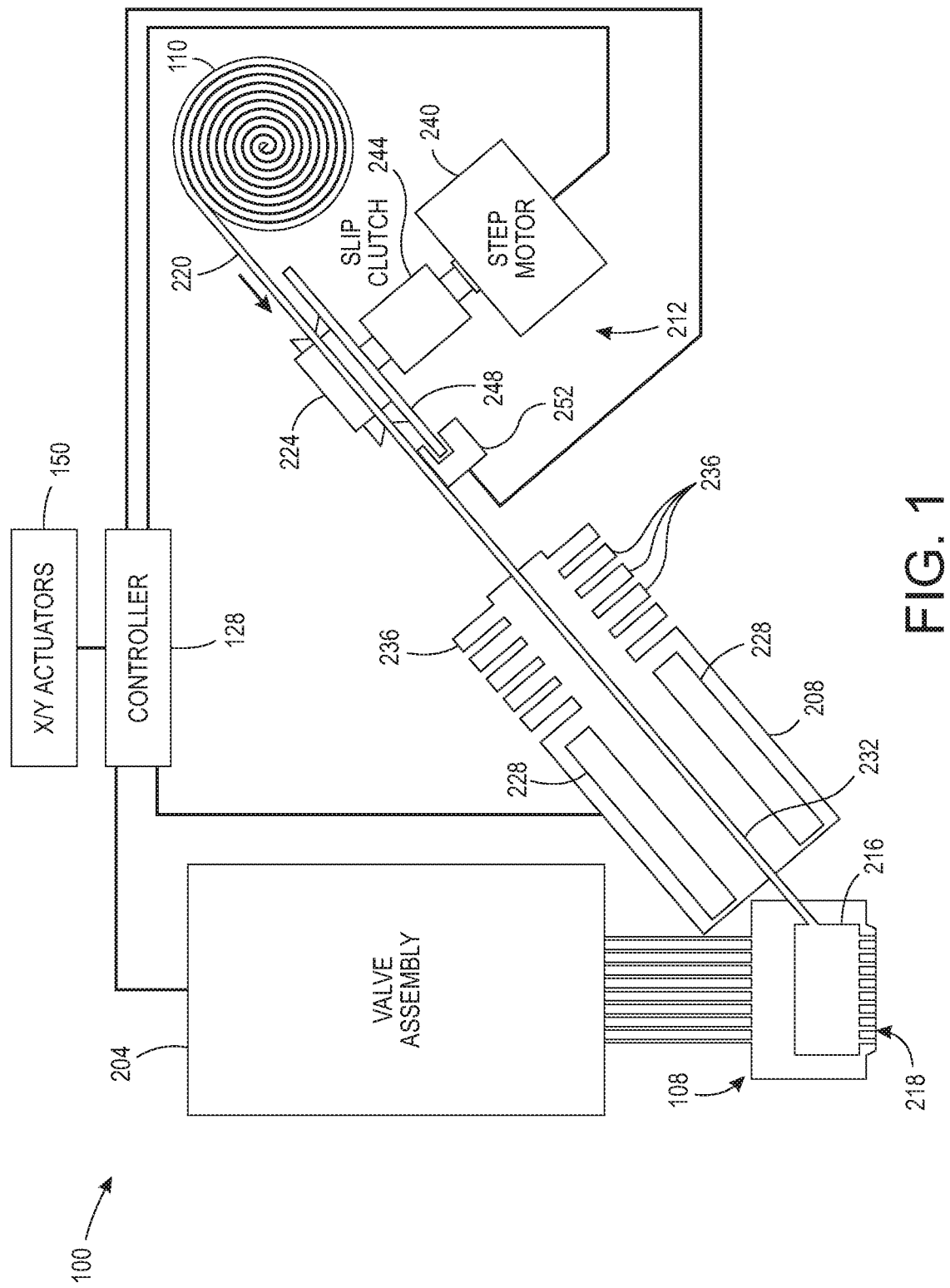
FIG. 1 depicts an additive manufacturing system in which an extruder head has a multi-nozzle arrangement that avoids aligning multiple nozzles at angular orientations from the 0°-180° axis and 90°-270° axis.
Figure 2A:
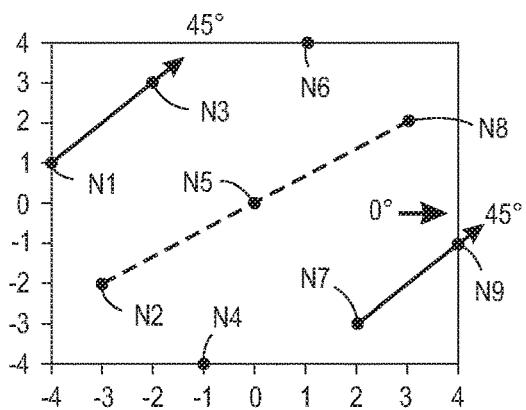
FIG. 2A to FIG. 2C depicts alternative nozzle arrangements conforming to the constraints that enable the extruder head to avoid aligning multiple nozzles at angular orientations from the 0°-180° axis and 90°-270° axis for a nine nozzle extruder head.
Figure 2B:
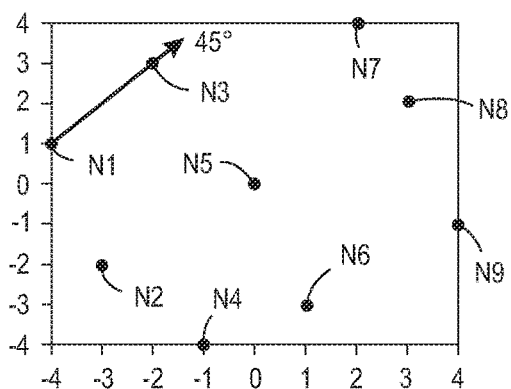
Figure 2C:
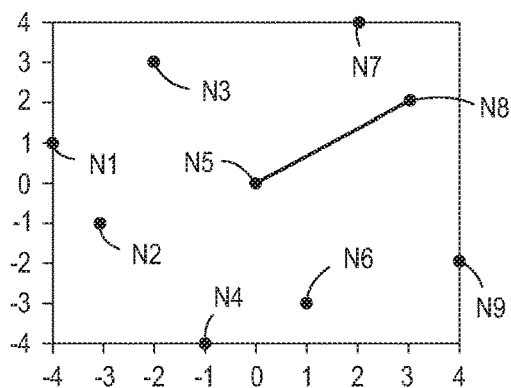
Figure 3A:
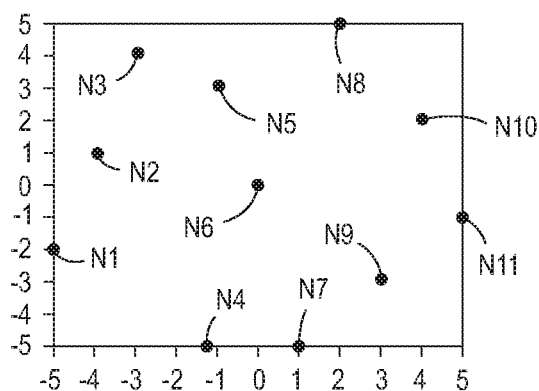
FIG. 3A to FIG. 3C depicts alternative nozzle arrangements conforming to the constraints that enable the extruder head to avoid aligning multiple nozzles at angular orientations from the 0°-180° axis and 90°-270° axis for a nine nozzle extruder head.
Figure 3B:
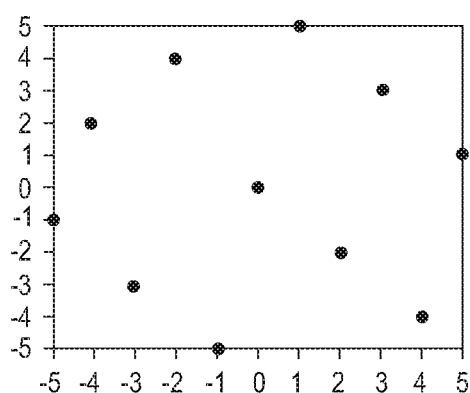
Figure 3C:
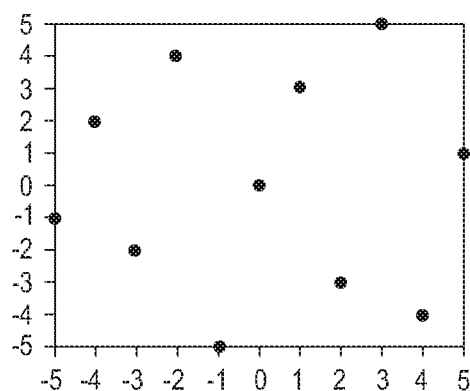
Figure 4A:
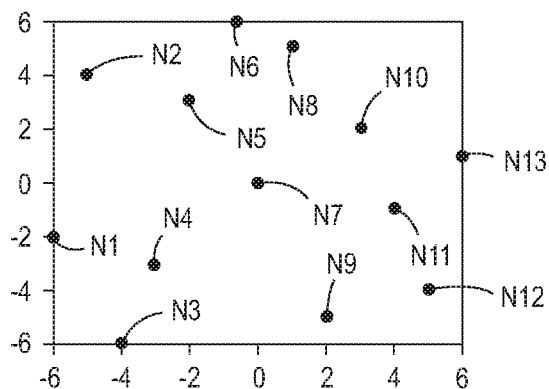
FIG. 4A to FIG. 4C depicts alternative nozzle arrangements conforming to the constraints that enable the extruder head to avoid aligning multiple nozzles at angular orientations from the 0°-180° axis and 90°-270° axis for a nine nozzle extruder head.
Figure 4B:
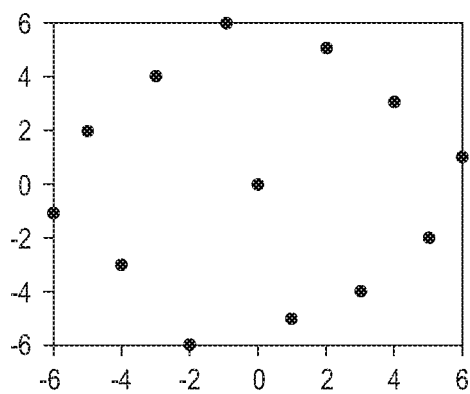
Figure 4C:
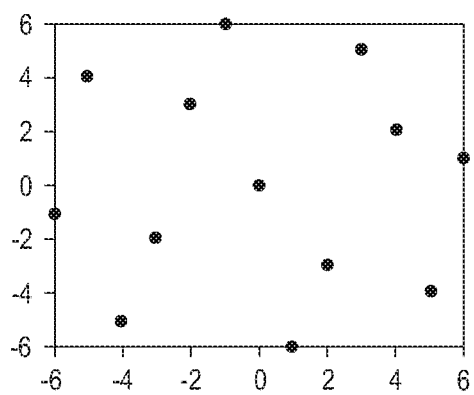

For a general understanding of the environment for the device disclosed herein as well as the details for the device, reference is made to the drawings. In the drawings, like reference numerals designate like elements.

As used herein, the term "extrusion material" refers to a material that is emitted from an extruder in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder. Build materials also include other materials that do not require heating but are later hardened by exposure to air or energy, such as UV light or heat. These types of materials include food materials. For example, chocolate and cheese can be extruded to form objects in various shapes, such as bunnies, eggs, or the like. Examples of support materials include, but are not limited to, high-impact polystyrene (HIPS), polyvinyl alcohol (PVA), and other materials capable of extrusion after being thermally treated. In some extrusion printers, the extrusion material is supplied as continuous elongated length of material commonly known as a "filament." This filament is provided in a solid form by one or more rollers pulling the extrusion material filament from a spool or other supply and feeding the filament into a heater that is fluidly connected to a manifold within the extruder. Although the illustrated examples use extrusion material that is supplied as filament to the heaters, other extrusion material supplies can be used, such as particulate or spherical ball extrusion materials. The heater softens or melts the extrusion material filament to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to extrusion material refers to any elevation of temperature for the extrusion material that softens or changes the phase of the extrusion material to enable extrusion of the thermoplastic material through one or more nozzles in an extruder during operation of a three-dimensional object printer. The melted extrusion material is also denoted as "thermoplastic material" in this document. As those of skill in the art recognize, certain amorphous extrusion materials do not transition to a pure liquid state during operation of the printer.

As used herein, the terms "extruder" refers to a component of a printer that pressurizes extrusion material in a single chamber so the extrusion material migrates to a manifold connected to one or more nozzles for emission. Multi-nozzle extruders described in this document include a valve assembly that can be electronically operated to enable extrusion material to flow through the nozzles selectively and independently. The valve assembly enables the one or more nozzles to be connected to the manifold independently to extrude extrusion material. As used herein, the term "nozzle" refers to an orifice in an extruder that is fluidly connected to the manifold in an extruder and through which extrusion material is emitted towards a material receiving surface. During operation, the nozzle can extrude a substantially continuous linear swath of the extrusion material along the process path of the extruder. A controller operates the valves in the valve assembly to control which nozzles connected to the valve assembly extrude extrusion material. The diameter of the nozzle affects the width of the line of emitted extrusion material. Different extruder embodiments include nozzles having a range of orifice sizes with wider orifices producing lines having widths that are greater than the widths of lines produced by narrower orifices.

As used herein, the term "manifold" refers to a cavity formed within a housing of an extruder that holds a supply of extrusion material for delivery to one or more nozzles in the extruder during a three-dimensional object printing operation. As used herein, the term "swath" refers to any pattern of multiple extrusion material ribbons emitted simultaneously from multiple nozzles of a multi-nozzle extruder onto a material receiving surface during a three-dimensional object printing operation. Single nozzle extruders are unable to form swaths as they can produce only a single bead of extrusion. Common swaths include straight-line linear arrangements of extrusion material and curved swaths. In some configurations, the extruder extrudes the material in a continuous manner to form the swath with a contiguous mass of the extrusion material in both process and cross-process directions, while in other configurations the extruder operates in an intermittent manner or at some angle of movement that forms smaller groups of extruded material that are discontinuous in either a process or cross-process direction and are arranged along a linear or curved path. The three-dimensional object printer forms various structures using combinations of different swaths of the extrusion material. Additionally, a controller in the three-dimensional object printer uses object image data and extruder path data that correspond to different swaths of extrusion material prior to operating a multi-nozzle extruder to form each swath of extrusion material.

As used herein, the term "process direction" refers to a direction of relative movement between an extruder and a material receiving surface that receives extrusion material emitted from one or more nozzles in the extruder. The material receiving surface is either a support member that holds a three-dimensional printed object or a surface of the partially formed three-dimensional object during an additive manufacturing process. In the illustrative embodiments described herein, one or more actuators move the extruder about the support member, but alternative system embodiments move the support member to produce the relative motion in the process direction while the extruder remains stationary. Some systems use a combination of both systems for different axes of motion. Additionally, one or more actuators are operatively connected to the extruder, the platform on which a three-dimensional object is formed, or both to move the extruder and the platform toward and away from one another. This type of movement is sometimes referred to as vertical movement or movement of the extruder, the platform, or both along the Z-axis.

As used herein, the term "cross process direction" refers to an axis that is perpendicular to the process direction and parallel to the extruder faceplate and the material receiving surface. The process direction and cross-process direction refer to the relative path of movement of the extruder and the surface that receives the extrusion material emitted from one or more nozzles. In some configurations, the extruder includes an array of nozzles that can extend in the process direction, the cross-process direction, or both. Adjacent nozzles within the extruder are separated by a predetermined distance in the cross-process direction. In some configurations, the system rotates the extruder to adjust the cross-process direction distance that separates different nozzles in the extruder to adjust the corresponding cross-process direction distance that separates the lines of extrusion material emitted from multiple nozzles in a multi-nozzle extruder as the lines form a swath.

During operation of the additive manufacturing system, an extruder moves in the process direction along both straight and curved paths relative to a surface that receives extrusion material during the three-dimensional object printing process. Additionally, an actuator in the system optionally rotates the multi-nozzle extruder about the Z axis to adjust the effective cross-process distance that separates nozzles in the multi-nozzle extruder to enable the extruder to form two or more lines of extrusion material with predetermined distances between each line of the extrusion material. The multi-nozzle extruder moves both along the outer perimeter to form outer walls of a two-dimensional region in a layer of the printed object and within the perimeter to fill all or a portion of the two-dimensional region with the extrusion material.

FIG. 1 depicts an additive manufacturing system 100 having an extruder head 108 that extrudes a plurality of thermoplastic materials through nozzle in one of the faceplates shown in FIG. 2A to FIG. 2C, FIG. 3A to FIG. 3C, and FIG. 4A to FIG. 4C, which are described in more detail below. Although the printer 100 is depicted as a printer that uses planar motion to form an object, other printer architectures can be used with the extruder head shown in these figures. These architectures include delta-bots, selective compliance assembly robot arms (SCARAs), multi-axis printers, non-Cartesian printers, and the like. The motions in these alternative embodiments still have process and cross-process directions as defined above and the nozzle spacing in the extruders of these embodiments still define the nozzle spacing with respect to the cross-process direction. Only one manifold 216 is shown within the housing of the extruder head 108 in FIG. 1 to simplify the figure, but the extruder head 108 can have a plurality of manifolds 216. In one embodiment, each manifold 216 in the extruder head 108 is operatively connected to a different heater 208 that is fed by a different extrusion material supply 110 in a one-to-one correspondence. In the extruder head 108, each nozzle 218 is fluidly connected to only one manifold within the extruder head 108 so each nozzle extrudes the same thermoplastic material, although each nozzle can be connected one manifold in a plurality of manifolds in a one-to-one correspondence so each nozzle extrudes a thermoplastic material that is different than the materials extruded from nozzles connected to other manifolds. Extrusion from each nozzle is selectively and independently activated and deactivated by controller 128 operating the valves in the valve assembly 204. Each nozzle 218 is also aligned with an aperture in a faceplate 260 to configure the nozzles for more flexible formation of swaths of the materials in an object. In FIG. 1, the extruder head 108 is shown in cross-section through the nozzle closest to the viewer's perspective.

In the embodiment of FIG. 1, a valve assembly 204 positions a valve between the one or more manifolds in the extruder head 108 and each of the nozzles connected to the one or more manifolds in the extruder head 108. The valve assembly 204 is operatively connected to the controller 128 so the controller can open and close the valves for extruding thermoplastic material from the plurality of nozzles in the extruder head 108. Specifically, the controller 128 activates and deactivates different actuators in the assembly 204 connected to the valves in the extruder head 108 to extrude thermoplastic material from the nozzles and form swaths of different thermoplastic materials in each layer of a three-dimensional printed object formed by the system.

The system 100 of FIG. 1 also includes an extrusion material dispensing system 212 for each heater 208 that is connected to a manifold in the extruder head 108. The extrusion material from each separate supply 110 is fed to the corresponding heater 208 at a rate that maintains the pressure of the thermoplastic material in the manifold connected to the heater within a predetermined range during operation of the system 100. The dispensing system 212 is one embodiment that is suitable for regulating pressure of the thermoplastic material in each manifold of the extruder head 108. Additionally, the controller 128 is operatively connected to an actuator for each dispensing system 212 to control the rate at which the dispensing system 212 delivers extrusion material from a supply 110 to the heater fed by the supply. The heater 208 softens or melts the extrusion material 220 fed to the heater 208 via drive roller 224. Actuator 240 drives the roller 224 and is operatively connected to the controller 128 so the controller can regulate the speed at which the actuator drives the roller 224. Another roller opposite roller 224 is free-wheeling so it follows the rate of rotation at which roller 224 is driven. While FIG. 1 depicts a feed system that uses an electromechanical actuator and the driver roller 224 as a mechanical mover to move the filament 220 into the heater 208, alternative embodiments of the dispensing system 212 use one or more actuators to operate a mechanical mover in the form of a rotating auger or screw. The auger or screw moves solid phase extrusion material from a supply 110 in the form of extrusion material powder or pellets into the heater 208.

In the embodiment of FIG. 1, each heater has a body formed from stainless steel that includes one or more heating elements 228, such as electrically resistive heating elements, which are operatively connected to the controller 128. Controller 128 is configured to connect the heating elements 228 to electrical current selectively to soften or melt the filament of extrusion material 220 in the channel or channels within the heater 208. While heater 208 is shown receiving extrusion material in a solid phase as solid filament 220, in alternative embodiments, the heaters receive the extrusion material in solid phase as powdered or pelletized extrusion material. Cooling fins 236 attenuate heat in the channels upstream from the heater. A portion of the extrusion material that remains solid in a channel at or near the cooling fins 236 forms a seal in the channel that prevents thermoplastic material from exiting the heater from any opening than the connection to the manifold 216, which maintains a temperature that keeps the extrusion material in a thermoplastic state as it enters the manifold. The extruder head 108 can also include additional heating elements to maintain an elevated temperature for the thermoplastic material within each manifold within the extruder. In some embodiments, a thermal insulator covers portions of the exterior of the extruder head 108 to maintain a temperature within the manifolds within the extruder.

To maintain a fluid pressure of the thermoplastic material within the manifolds 216 within a predetermined range, avoid damage to the extrusion material, and control the extrusion rate through the nozzles, a slip clutch 244 is operatively connected to the drive shaft of each actuator 240 that feeds filament from a supply 110 to a heater. As used in this document, the term "slip clutch" refers to a device applies frictional force to an object to move the object up to a predetermined set point. When the range about the predetermined set point for the frictional force is exceeded, the device slips so it no longer applies the frictional force to the object. The slip clutch enables the force exerted on the filament 220 by the roller 224 to remain within the constraints on the strength of the filament no matter how frequently, how fast, or how long the actuator 240 is driven. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252. The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its average speed is slightly faster than the rotation of the roller 224. This operation ensures that the torque on the drive roller 224 is always a function of the slip clutch torque.

The controller 128 has a set point stored in memory connected to the controller that identifies the slightly higher speed of the actuator output shaft over the rotational speed of the roller 224. As used in this document, the term "set point" means a parameter value that a controller uses to operate components to keep the parameter corresponding to the set point within a predetermined range about the set point. For example, the controller 128 changes a signal that operates the actuator 240 to rotate the output shaft at a speed identified by the output signal in a predetermined range about the set point. In addition to the commanded speed for the actuator, the number of valves opened or closed in the valve assembly 204 and the torque set point for the clutch also affect the filament drive system 212 operation. The resulting rotational speed of the roller 224 is identified by the signal generated by the sensor 252. A proportional-integral-derivative (PID) controller within controller 128 identifies an error from this signal with reference to the differential set point stored in memory and adjusts the signal output by the controller to operate the actuator 240. Alternatively, the controller 128 can alter the torque level for the slip clutch or the controller 128 can both alter the torque level and adjust the signal with which the controller operates the actuator.

The slip clutch 244 can be a fixed or adjustable torque friction disc clutch, a magnetic particle clutch, a magnetic hysteresis clutch, a ferro-fluid clutch, an air pressure clutch, or permanent magnetic clutch. The clutch types that operate magnetically can have their torque set points adjusted by applying a voltage to the clutches. This feature enables the torque set point on the clutch to be changed with reference to print conditions. The term "print conditions" refers to parameters of the currently ongoing manufacturing operation that affect the amount of thermoplastic material required in the manifold for adequate formation of the object. These print conditions include the type of extrusion material being fed to the extruder, the temperature of the thermoplastic material being emitted from the extruder, the speed at which the extruder is being moved in the X-Y plane, the position of the feature being formed on the object, the angle at which the extruder is being moved relative to the platform, and the like.

In the system shown in FIG. 1, the controller 128 is configured to transmit one or more signals to the X/Y actuators 150 to regulate the speed at which the extruder head 108 is moved above platform 102. The controller 128 is configured to regulate the speed of the extruder head 108 with reference to the angle of the path at which the extruder head 108 is to be moved and the orientation of the extruder faceplate as it moves along that path. When the extruder head 108 having the nozzle arrangements shown in FIG. 2A to FIG. 2C, FIG. 3A to FIG. 3C, and FIG. 4A to FIG. 4B is moved during extrusion in either direction along the 0°-180° axis or the 90°-270° axis and the extruder faceplate is oriented as shown in the figures, the controller 128 moves the extruder at a nominal speed with reference to the number of nozzles opened for the extrusion of thermoplastic material. Although an extruder face can theoretically be oriented so all of the opened nozzles contribute to a contiguous swath along any motion path, practical considerations can prevent such orientations. When object image data and extruder path data require an orientation for the extruder head faceplate and its motion path relative to the platform that interferes with the ability of the extruder head to form a contiguous swath, the controller can reduce the speed at which the extruder head is moved along that motion path relative to the platform to address this interference.

Figure 5:
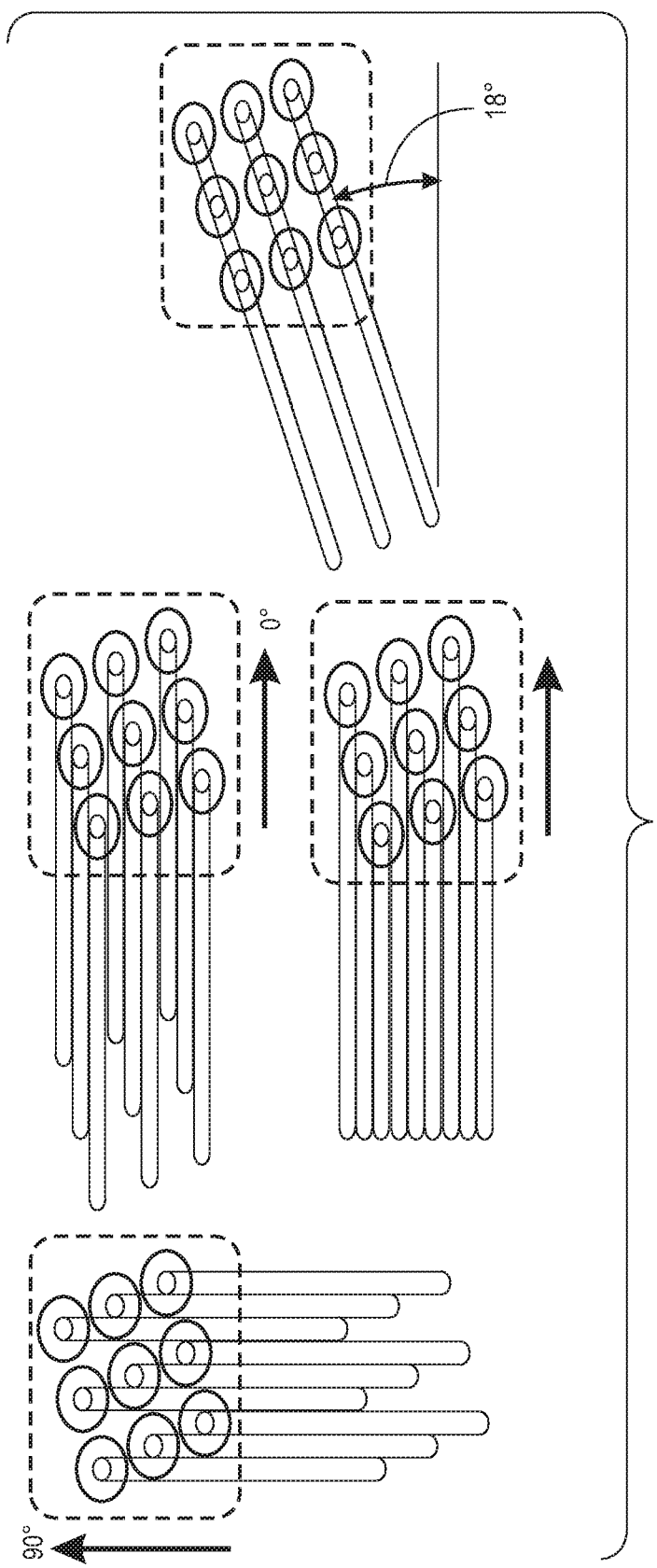
FIG. 5 depicts swaths that can be formed by a nine nozzle faceplate when oriented at 0°, 90°, and 18°.

To reduce the issues arising from a nozzle arrangement of multiple nozzles that can be moved along a path that aligns the nozzles so they form separated lines in a swath as noted above with regard to FIG. 5, constraints are used to reduce significantly the number of possible arrangements. The first constraint is that optimal nozzle spacing is required in the 0°-180° axis and the 90°-270° axis directions. This constraint ensures optimal swath formation for the interior of objects where the swaths are formed by alternating the path directions between the 0°-180° axis and the 90°-270° axis directions to reduce the likelihood of weak spots within the part. This constraint means that if each nozzle location is projected onto the 0°-180° axis passing through the center nozzle position or onto the 90°-270° axis then the nozzles are equally spaced from one another. The term "projected" as used in this document means moving the nozzle position to the axis on which it is being projected along a line that is perpendicular to the axis and the nozzle. This constraint also encompasses an embodiment in which the diameter of the center nozzle is less than the diameter of the remaining nozzles. In this embodiment, the spacing between the nozzles adjacent to the center nozzle when projected on one of the orthogonal axes is less than the spacing between the other nozzles projected onto the axes on either side of the center nozzle.

A second constraint is that the nozzles must be separated by some minimal distance. The minimal distance is necessary, for example, to enable the reciprocating members of the valve assembly to have sufficient area to enter the upper surfaced of the extruder head and to preserve the structural integrity of the faceplate. That is, some of the nozzles could be positioned at locations that do not provide enough faceplate metal between the nozzles to prevent faceplate flexing. A third constraint arises from how the perimeter of objects are formed. Typically, all of the nozzles are equally sized and the perimeter is formed with material extruded from the center nozzle and those nozzles inside the perimeter of the object formed by the center nozzle. The nozzles outside the perimeter of the object formed by the center nozzle are not opened. Thus, the third constraint is that the nozzle arrangement has an odd number of nozzles with the central nozzle positioned in the middle of the faceplate when the nozzles are equally sized. The term "middle of the faceplate" means the nozzle that is in the middle of the nozzles projections on the horizontal and vertical orthogonal axes. These three constraints are necessary for a nozzle arrangement that does not form only separated lines in a swath at particular angular orientations from the 0°-180° axis or the 90°-270° axis directions. Applying these constraints and some of the other constraints discussed below yields the nozzle arrangements for a nine nozzle faceplate shown in FIG. 2A to FIG. 2C, the nozzle arrangements for a eleven nozzle faceplate shown in FIG. 3A to FIG. 3C, and the nozzle arrangements for a thirteen nozzle faceplate shown in FIG. 4A to FIG. 4C.

Other constraints can be used to select between the arrangements that satisfy the three necessary constraints. One of these less rigid criteria is the distance between the outermost nozzles of the nozzle arrangement and the center nozzle regardless of the angle at which the extruder is moved to form swaths. This criterion enables the perimeter of an object to be formed with swaths of approximately the same width regardless of angular orientation of the extruder since the same number of nozzles are provided to the right and left of the center nozzle and the outermost nozzles in each direction are at approximately the same distance from the center nozzle. The outermost nozzle is the nozzle furthest from the center nozzle in a direction that is perpendicular to the path of extruder movement. A candidate nozzle layout can be evaluated for compliance with this criterion by measuring the distance from the center nozzle to the outermost nozzle for all angles of extruder movement and the difference between the largest and smallest distance to the outermost nozzle. For some designs, such as those having eleven or more nozzles and that still satisfy the other criterion previously noted, the difference can be made less than two nozzle diameters or even less than 1.5 nozzle diameters and meet this criterion. For candidate nozzle layouts having less than eleven nozzles and that still satisfy the other criterion previously discussed, the difference can be less than 2.5 nozzle diameters and still meet this criterion. Those candidate layouts that have too large of a variation in the swath widths are eliminated. That is, nozzle layouts having eleven or more nozzles and that have a swath width variation greater than two nozzle diameters are eliminated. Likewise, nozzle layouts having less than eleven nozzles and that have a swath width variation greater than 2.5 nozzle diameters are eliminated. Additionally, the difference in swath widths can be mitigated by changing the process speed—slower speeds at angles with small distances to the outer nozzle enable more spreading of material to ensure a more equal swath width independent of extruder movement angle. Thus, nozzle arrangements that have a difference small enough to allow speed changes to make up that difference can be important.

Another criterion for arrangement selection is to reduce the number and impact of angles that align nozzles in the arrangement. The first line of approach is to limit the allowable size of any gap between neighboring nozzles in the process direction regardless of angle. A neighboring nozzle, as used in this document, means a nozzle that produces a line of material closer to a line formed by the reference nozzle. For example, in FIG. 2A, when the extruder head is move along the 90 axis, the neighboring nozzles to the nozzle designated N4 are N3 and N5 but when the extruder head is moved along a path that aligns the lines produced by N2, N5, and N8, the neighboring nozzles to N4 are N7 and N8. Thus, the lines produced by N4, N7, and N8 are constrained to be separated by no more than a predetermined distance. Another criterion for arrangement evaluation is to limit the number of gaps between lines produced by neighboring nozzles to a predetermined number. To evaluate this criterion, the nozzle arrangement is rotated about a normal to the faceplate center and the spacing of the nozzles at each angular orientation is evaluated. From this evaluation, the reductions in the nominal speed can be identified that enable neighboring nozzles to spread their lines sufficiently to cover the gaps that would otherwise be present when a perimeter is being formed at a particular angular orientation. For example, the evaluation of the angular orientation that aligns N2, N5, and N8 identifies a speed reduction that enables the material lines formed by N4 and N6 to spread sufficiently to meet the common line of material being formed by nozzles N2, N5, and N8. Then the average speed can be calculated for all angles and only the arrangements with an average speed above a certain minimum are allowed to pass this criterion.

Another criterion used to evaluate different nozzle arrangements is to limit the number of nozzles that line up at any of the possible angular orientations. This criterion can be used for any grouping of nozzles. For example, moving the arrangement in FIG. 2A along a 45° path aligns N1 with N3 and N7 with N9. Applying this criterion to the arrangement results in the arrangement shown in FIG. 2B where N6 and N7 have been shifted so N7 and N9 no longer align with one another on the 45° path. Instead, only N1 and N3 do. Similarly, N2, N5, and N8 can be aligned in one angular orientation in the arrangement of FIG. 2A and FIG. 2B but with the shift of N2 as show in FIG. 2C, this triple nozzle alignment can be reduced to two, namely, N5 and N8. An expedient shortcut to this approach is evaluate groups of nozzles that align with the center nozzle. This approach is less computationally intensive and captures many of the more problematic arrangements.

Various programming languages, such as Matlab, Python, C, and R, can be used to implement a process for generating nozzle arrangement permutations and evaluating them with reference to the constraints and criteria noted previously. The process begins with an odd number of X nozzles having the neighboring nozzles in the 0°-180° axis or the 90°-270° axis directions equally spaced from one another. The process then generates all permutations of X-1 nozzles with the same spacings in 90°-270° axis and the center nozzle remaining unmoved. For large values of X, the permutations are broken into blocks to preserve memory and array size limits but also to preserve an advantage of a programming language, such as Matlab's array processing capabilities. The number of possibilities is quickly reduced with reference to the constraint of the predetermined distance between nozzles. The number of candidate arrangements is further reduced by selecting for circularity, limiting the largest gap between nozzles at all angles, and limiting the number of nozzles aligned with the center nozzle at any angle. Additionally, symmetry is a useful criterion for eliminating redundant candidates since any permutation of a nozzle arrangements that has left/right, top/bottom, or rotational symmetry of an already considered candidate is determined to be equivalent to the previously considered candidate and does not need to be further evaluated. Other criteria that can be used for further reduction are how many angular orientations produce gaps between lines of material above a predetermined threshold, the distance between the outermost nozzle and the center nozzle in any direction to preserve the uniformity in width of the perimeters formed, and other criteria that vary with angle.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:
1. An extruder head comprising:
   a housing having at least one manifold configured to hold a volume of extrusion material; and
   a faceplate mounted to the housing, the faceplate having a plurality of nozzles formed in the faceplate that are fluidly connected to the at least one manifold and the nozzles in the faceplate are equally spaced from one another when the nozzles are projected onto a first axis in a plane of the faceplate and the nozzles are equally spaced from one another when projected onto a second axis in the plane of the faceplate that is orthogonal to the first axis, and
   movement of the extruder head along any angular path from an intersection of the first axis and the second axis in the plane of the faceplate enables at least one nozzle in the plurality of nozzles to not be aligned with any other nozzle.

2. The extruder head of claim 1 wherein a number of nozzles in the plurality of nozzles is odd.

3. The extruder head of claim 2 wherein all of the nozzles have a same diameter.

4. The extruder head of claim 3 wherein one of the nozzles is located at a center in the plane of the faceplate.

5. The extruder head of claim 4 wherein a number of the nozzles located on a first side of the center nozzle is equal to a number of the nozzles located on a second side of the center nozzle.

6. The extruder head of claim 5 wherein a nozzle on the first side of the center nozzle is at a greater distance from the center nozzle than any of the other nozzles on the first side of the center nozzle and is at a same distance from the center nozzle as a nozzle on the second side of the center nozzle that is at a greater distance from the center nozzle than any of the other nozzles on the second side of the center nozzle.

7. The extruder head of claim 6 wherein a difference between a smallest distance between the center nozzle and an outermost nozzle along any path angle for the extruder head movement and a greatest distance between the center nozzle and an outermost nozzle along any path angle of the extruder head movement does not exceed 2.5 nozzle diameters and the number of nozzles in the extruder head is less than eleven.

8. The extruder head of claim 6 wherein a difference between a smallest distance between the center nozzle and an outermost nozzle along any path angle for the extruder head movement and a greatest distance between the center nozzle and an outermost nozzle along any path angle of the extruder head movement does not exceed two nozzle diameters and the number of nozzles in the extruder head is eleven or greater.

9. The extruder head of claim 8 wherein the difference does not exceed 1.5 nozzle diameters.

10. The extruder head of claim 1 wherein the first axis is aligned with a 0°-180° axis and the second axis is aligned with a 90°-270° axis and the first axis and the second axis intersect at the center of the faceplate.

11. The extruder head of claim 10 wherein a number of the nozzles is equal to or greater than nine and at no angle of the extruder head movement do three or more nozzles align to extrude extrusion material on top of extrusion material extruded by another nozzle.

12. An extruder head comprising:

a housing having at least one manifold configured to hold a volume of extrusion material;

a faceplate mounted to the housing, the faceplate having a plurality of nozzles formed in the faceplate that are fluidly connected to the at least one manifold and the nozzles in the faceplate are equally spaced from one another when the nozzles are projected onto a first axis in a plane of the faceplate and the nozzles are equally spaced from one another when projected onto a second axis in the plane of the faceplate that is orthogonal to the first axis, a number of nozzles in the plurality of nozzles is odd, and one of the nozzles in the plurality of nozzles is located at a center of the faceplate; and movement of the extruder head along any angular path from an intersection of the first axis and the second axis in the plane of the faceplate enables at least one nozzle in the plurality of nozzles to not be aligned with any other nozzle.

13. The extruder head of claim 12 wherein a number of the nozzles located on a first side of the center nozzle is equal to a number of the nozzles located on a second side of the center nozzle.

14. The extruder head of claim 13 wherein a nozzle on the first side of the center nozzle is at a greater distance from the center nozzle than any of the other nozzles on the first side of the center nozzle and is at a same distance from the center nozzle as a nozzle on the second side of the center nozzle that is at a greater distance from the center nozzle than any of the other nozzles on the second side of the center nozzle for both the first axis and the second axis.

15. The extruder head of claim 14 wherein a difference between a smallest distance between the center nozzle and an outermost nozzle along any path angle for the extruder head movement and a greatest distance between the center nozzle and an outermost nozzle along any path angle of the extruder head movement does not exceed 2.5 nozzle diameters and the number of nozzles in the extruder head is less than eleven.

16. The extruder head of claim 15 wherein the first axis is aligned with a 0°-180° axis and the second axis is aligned with a 90°-270° axis and the first axis and the second axis intersect at the center of the faceplate.

* * * * *